United States Patent
Sonoda et al.

(10) Patent No.: US 7,222,215 B2
(45) Date of Patent: May 22, 2007

(54) NAS WITH WORM FUNCTION

(75) Inventors: Koji Sonoda, Sagamihara (JP); Yoji Nakatani, Yamato (JP); Takahiro Nakano, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 79 days.

(21) Appl. No.: 10/892,187

(22) Filed: Jul. 16, 2004

(65) Prior Publication Data
US 2005/0257000 A1   Nov. 17, 2005

(30) Foreign Application Priority Data
May 14, 2004   (JP) ............... 2004-144687

(51) Int. Cl.
*G06F 12/00*   (2006.01)
*F06F 11/00*   (2006.01)
(52) U.S. Cl. ..................... 711/112; 711/170; 714/8
(58) Field of Classification Search ............ None
See application file for complete search history.

(56) References Cited

U.S. PATENT DOCUMENTS

| | | | |
|---|---|---|---|
| 5,265,230 A | | 11/1993 | Saldanha et al. |
| 5,566,331 A | * | 10/1996 | Irwin et al. ............ 707/10 |
| 6,583,945 B1 | | 6/2003 | Bar et al. |
| 6,886,086 B2 | | 4/2005 | Kobayashi et al. |
| 6,912,645 B2 | | 6/2005 | Dorward et al. |
| 2001/0034812 A1 | | 10/2001 | Ignatius et al. |
| 2004/0268038 A1 | * | 12/2004 | Nagasoe et al. ............ 711/114 |
| 2005/0055518 A1 | | 3/2005 | Hochberg et al. |
| 2005/0182900 A1 | * | 8/2005 | Matsunami et al. ........ 711/114 |
| 2005/0216794 A1 | * | 9/2005 | Yagawa ........................ 714/42 |
| 2005/0223164 A1 | * | 10/2005 | Kitamura .................... 711/112 |
| 2005/0235095 A1 | * | 10/2005 | Winarski et al. ............... 711/4 |

OTHER PUBLICATIONS

Network Appliance—NearStore, "Cost effective, fast-access storage for backup and recovery, reference data, online archival, and remote disaster recovery."

* cited by examiner

*Primary Examiner*—Hyung Sough
*Assistant Examiner*—Craig E Walter
(74) *Attorney, Agent, or Firm*—Antonelli, Terry, Stout & Kraus, LLP.

(57) ABSTRACT

A storage system capable of cutting back the resource while obtaining a WORM function. A controller (110) functions to: obtain, when a write request is made by a computer (300), information on one of logical devices that is a target of a write process, from a memory module (140); and inform, when the logical device is set to unwritable, a signal indicating that the logical device is set to unwritable, to the computer (300). An interface (200) functions to: reference meta-information held in a disk drive (130) to obtain a list of files that are not accessed for a predetermined period; secure a logical device; and cause the controller (110) to store, the files on the list of files and set the logical device that stores the files in a manner that makes information stored in the memory module (140) unwritable.

10 Claims, 14 Drawing Sheets

| dev_name | mnt_point | fs_type | mode | A_time |
|---|---|---|---|---|
| /dev/lu1 | /top | meta | rw | Time1 |
| /dev/lu2 | /data | data | rw | Time2 |
| ...... | | | | |
| /dev/luN | /mnt-N | temp | r | TimeN |

MNT Table 2032

FIG.2

| LDEV num | type | LU num |
|---|---|---|
| 0 | cmd | 0 |
| 1 | regular | 1 |
| 2 | regular | 2 |
| ...... | | |
| 500 | WORM | -1 |
| 501 | WORM | 244 |
| 502 | regular | -1 |
| ...... | | |

MAP Table 2042

FIG.3

| LU num | Ldev num |
|---:|---:|
| 0 | 0 |
| 1 | 1 |
| 2 | 2 |
| ...... | |
| 243 | 400 |
| 244 | 501 |
| 245 | -1 |

LU Table 1401

FIG.4

| LDEV num | type | Size |
|---:|---:|---:|
| 0 | cmd | 0 |
| 1 | regular | 1,000,000,000 |
| 2 | regular | 2,000,000,000 |
| ....... | | |
| 500 | WORM | 500,000,000 |
| 501 | WORM | 500,000,000 |
| 502 | regular | 500,000,000 |
| ....... | | |

LDEV Table 1402

FIG.5

| | |
|---|---|
| name | file1 |
| size | 128000 |
| ldev num | 501 |
| ldev path | /file1 |
| last access | time |
| type | worm |

Meta info

FIG.6

| LDEV num | type | size | wbegin |
|---|---|---|---|
| 0 | cmd | 0 | 0 |
| 1 | regular | 1,000,000,000 | 0 |
| 2 | regular | 2,000,000,000 | 0 |
| 500 | WORM | 500,000,000 | 500,000,000 |
| 501 | WORM | 500,000,000 | 500,000,000 |
| 502 | WORM | 500,000,000 | 100,000 |

LDEV Table 1402

FIG.12

| LDEV num | type | LU num | size | wbegin |
|---:|---:|---:|---:|---:|
| 0 | cmd | 0 | 0 | 0 |
| 1 | regular | 1 | 1,000,000,000 | 0 |
| 2 | regular | 2 | 2,000,000,000 | 0 |
| 500 | WORM | -1 | 500,000,000 | 500,000,000 |
| 501 | WORM | 244 | 500,000,000 | 500,000,000 |
| 502 | WORM | -1 | 500,000,000 | 100,000 |

MAP Table 2042

FIG.13

NAS WITH WORM FUNCTION

CLAIM OF PRIORITY

The present application claims priority from Japanese application P2004-144687 filed on May 14, 2004, the content of which is hereby incorporated by reference into this application.

BACKGROUND

The present invention relates to a storage system which stores files used by computers. More specifically, the invention relates to a storage system capable of saving the resource while exerting a WORM function.

When holding electronic data in a memory device such as a storage, there are problems in that as a retention period of the electronic data becomes longer and an amount of data increases, a demanded capacity of the storage also increases, requiring higher costs. Therefore, more important data is recorded on a high-speed storage with a large transfer bandwidth, and less important data is recorded on a relatively low-speed storage. Such a high-speed storage with the large transfer bandwidth costs high, and such a relatively low-speed storage costs low. Further, based on the date when the data is saved (i.e., the archive date), fresh data (data for which not much time has elapsed since being archived) is recorded on the high-speed storage, and old data (data for which a given duration of time has elapsed since being archived) is recorded on the low-speed storage. This type of data management method is called Data Lifecycle Management (DLCM).

One of known file archive mechanisms which are designed by taking into account long-term file retention in this data lifecycle management is Write Once Read Many (WORM) archive, which manages modification, and erasure of files whose archive period has not expired yet. In order to apply WORM to a memory device, a storage device or a controller has to have a WORM function.

An example of a WORM function for Network Attached Storage (NAS) is a technology proposed to make any erasure, modification or such on a file that is stored under a specific directory impossible by setting the mode bit of the file to "Read Only" through a NAS server (see, for example, the following internet article:
Network Appliance, "NetApp NearStore", [online],
<URL: http://www.netapp.com/products/nearstore/>).

SUMMARY

According to the article cited above, the WORM function is obtained by setting "writable" or "unwritable" for each file on the file system level. The WORM function given in this manner to a storage device does not work when a SAN client or the like directly accesses a volume in the storage device, allowing data alteration. The cited technique also takes up a large part of the resource of the NAS server since every volume of the storage device has to be recognized by the NAS server.

It is therefore an object of the present invention to provide a storage system capable of cutting back the resource while obtaining a WORM function on a volume level of a storage device.

In a storage system according to the present invention, a controller obtains from the memory module information on one of logical devices that is a target of a write request is made by a computer, and when the logical device is set to unwritable, informs the fact to the computer. An interface references meta-information held in the disk drive to obtain a list of files that are not accessed for a predetermined period, secures a logical device that is capable of storing the files on the obtained list of files, and causes the controller to store, in the logical device, the files on the list of files and sets to unwritable the logical device that stores the files in a manner that makes information stored in the memory module.

The present invention enables a storage system to obtain a WORM function on the logical device level and to cut back the resources of an interface (NAS head) and a RAID device.

BRIEF DESCRIPTION OF THE DRAWINGS

FIG. 2 is an explanatory diagram showing an example of a configuration of an MNT Table 2032 according to the first embodiment of the present invention.

FIG. 3 is an explanatory diagram showing an example of a configuration of a MAP Table 2042 according to the first embodiment of the present invention.

FIG. 4 is an explanatory diagram showing an example of a configuration of an LU Table 1401 according to the first embodiment of the present invention.

FIG. 5 is an explanatory diagram showing an example of a configuration of an LDEV Table 1042 according to the first embodiment of the present invention.

FIG. 6 is an explanatory diagram showing an example of a configuration of Meta info according to the first embodiment of the present invention.

FIG. 12 is an explanatory diagram showing an example of a configuration of an LDEV Table 1042 according to a second embodiment of the present invention.

FIG. 13 is an explanatory diagram showing an example of a configuration of an MAP Table 2042 according to the second embodiment of the present invention.

DETAILED DESCRIPTION OF THE PREFERRED EMBODIMENTS

Storage systems according to embodiments of the present invention will be described below with reference to the accompanying drawings.

Figure 1:
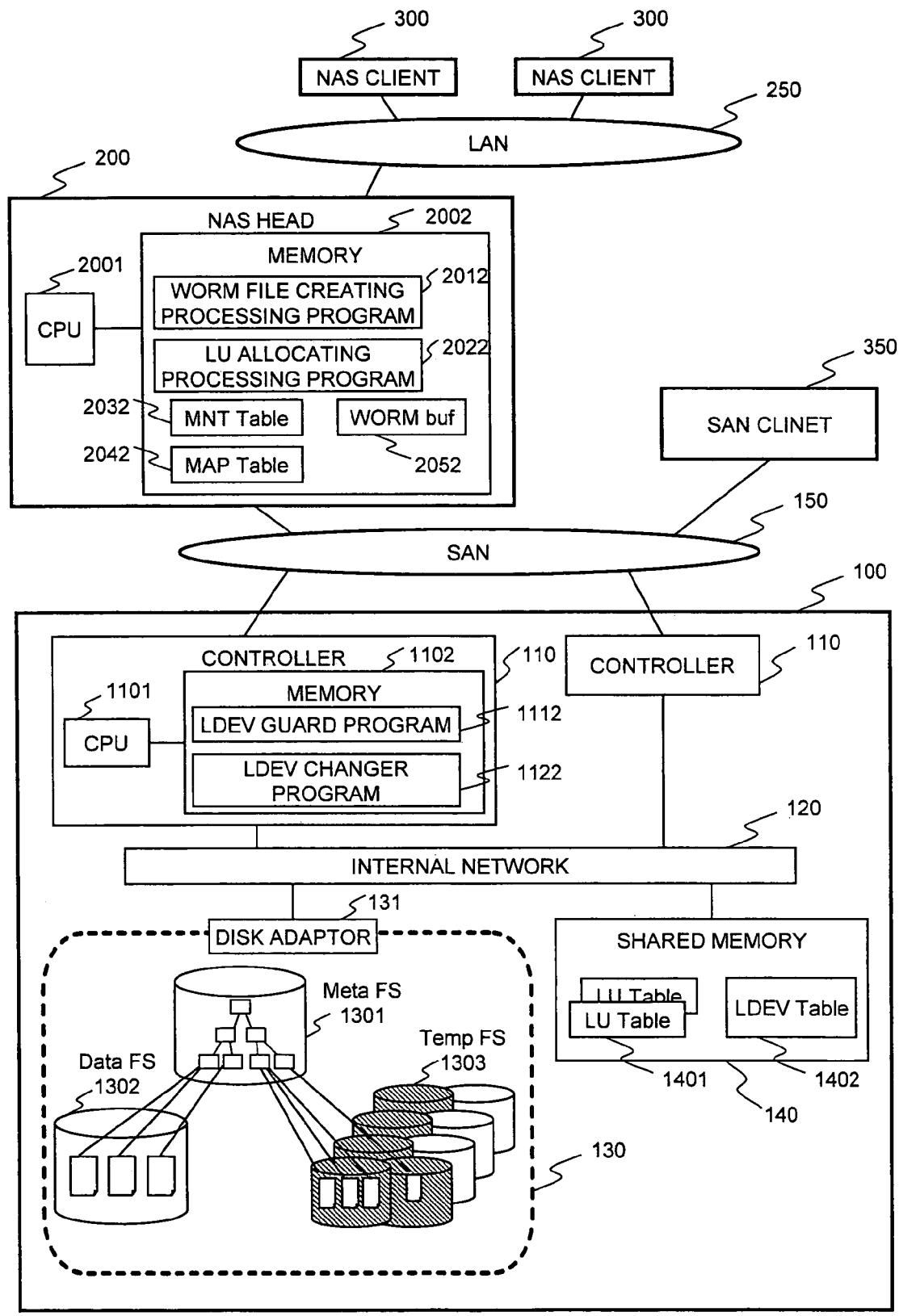
FIG. 1 is a block diagram showing a configuration of a storage system according to a first embodiment of the present invention.

FIG. 1 is a block diagram showing a configuration of a storage system according to a first embodiment of the present invention.

A RAID device 100 is connected to a NAS (Network Attached Storage) head 200 and to a SAN client 350 through a SAN (Storage Area Network) 150. The NAS head 200 and each NAS client 300 are connected to one another through a LAN (Local Area Network) 250.

In the RAID device 100, a controller 110, a shared memory 140, and a disk drive 130 are connected to one another through an internal network 120.

The controller 110 receives file data sent from the NAS head 200 or the SAN client 350 through the SAN 150, and sends file data of the RAID device 100 to the NAS head 200 or the SAN client 350 through the SAN 150. The controller 110 also receives a control command sent from the NAS head 200 or the SAN client 350 through the SAN 150, and carries out processing based on the received control command. The controller 110 is equipped with a control device (CPU) 1101 and a memory 1102. The memory 1102 stores an LDEV guard program 1112 and an LDEV changer program 1122. These programs are, as will be described later, executed by the CPU based on a control command received by the controller 110, thereby starting given processing. The memory 1102 is comprised a memory module that is semiconductor memory, magnetic disk or the like.

The disk drive 130 is composed of logical devices (LDEVs) obtained by logically dividing plural hard disks which take the RAID configuration. The disk drive 130 is connected to the internal network 120 through a disk adaptor 131. Each LDEV has an LDEV number (LDEV num) unique throughout the RAID device 100, and is registered in an LDEV Table 1402.

The disk drive 130 breaks into a meta file system (Meta FS) 1301, a data file system (Data FS) 1302, and a temporary file system (Temp FS) 1303 in keeping with file systems provided by the NAS head 200. The Meta FS 1301 holds meta-information of every file that is stored in the disk drive 130. The Data FS 1302 holds file data. The Temp FS 1303 holds file data similar to the Data FS 1302, but is set in a manner that allows the file system to be mountable and unmountable to a file system of the NAS head.

The shared memory 140 is a memory device for storing configuration information or the like of the disk drive 130. The shared memory 140 holds the one LDEV Table 1402, which covers the entire RAID device 100, and an LU Table 1401, which is provided for each controller 110. The LDEV Table 1402 holds information for managing the LDEVs of the disk drive 130 (management information). The management information includes LDEV numbers, which are unique to the respective LDEVs throughout the RAID device 100, the types and sizes of the LDEVs, and the like. The LU Table 1401 holds LU (Logical Unit) numbers (LU nums) each of which is associated with an LDEV number. The LU numbers are identifiers used by the NAS head 200 to read/write a block through the controller 110. The shared memory 140 is comprised a memory module that is semi-conductor memory, magnetic disk or the like.

The NAS head 200 functions as an interface that provides the NAS client 300, through a file system, with the data stored in the RAID device 100.

The NAS head 200 is equipped with a control device (CPU) 2001 and a memory 2002. The memory 2002 holds a WORM file creating processing program 2012, an LU allocating processing program 2002, a mount Table (MNT Table) 2032, a MAP Table 2042, and a WORM buffer (WORM buf) 2052. The memory 2002 is comprised a memory module that is semiconductor memory, magnetic disk or the like.

The WORM file creating processing program 2012 and the LU allocating processing program 2022 are executed, as will be described later, by the CPU 2001 upon request from the NAS client 300 (a file read/write request or the like), thereby starting given processing.

The MNT Table 2032 holds the association between the LU numbers mounted on the NAS head 200 as a file system and their mount points. The MAP Table 2042 holds the association between every LU number that is managed by the NAS head 200 and the LDEV number allocated to the LU number in question.

The WORM buf 2052 temporarily holds data created as an image in the UDF (Universal Disk Format) format when a file is stored as a WORM file in an LDEV upon request from the NAS client 300. It is therefore unnecessary to set an area of the memory 2002 aside for the WORM buf 2052 all the time. The WORM buf 2052 may be set in the disk drive 130 when the UDF image has large data size.

In the RAID device 100, a command device is defined for each controller 110. The NAS head 200 or the SAN client 350 issues a given command (for example, to secure an LDEV, to change which LU number is associated with which LDEV number, or to change the type of an LDEV) by informing the command to a defined command device.

The Temp FS 1303, of the disk drive 130 is not always mounted to a file system provided by the NAS head 200. The Temp FS 1303 holds WORM files which might not be accessed for a long period (several tens years, for instance), while the Meta FS 1301 and the Data FS 1302 hold files that are frequently accessed. Keeping every LDEV mounted to the file system is not practical since it is a waste of resources of the NAS head 200 and of the RAID device 100.

LU mount/unmount processing takes time and is a heavy load on the system, which makes it desirable to keep mounted an LU that has a frequently accessed file. On the other hand, in the Temp FS 1303 which stores WORM files that might not be accessed for a long period, an LU is mounted only when a WORM file stored therein is to be accessed and is kept unmounted for the rest of the time. In this way, it is possible to take full advantage of the resources of the NAS head 200 and the RAID device 100.

Of the LUs in the Temp FS 1303 of FIG. 1, crosshatched ones represent LUs that are mounted, while outlined ones represent LUs that are unmounted.

The LUs may be mounted/unmounted dynamically as the need arises. The LU mount/unmount processing will be discussed later.

FIG. 2 is an explanatory diagram of the MNT Table 2032 held in the memory 2002 of the NAS head 200.

The NAS head 200 is an interface which provides a file system to the NAS client 300. The MNT Table 2032 is used for management of directory information and directory attributes (write/read and the like) in order to provide a file system.

The MNT Table 2032 is composed of the name of a device mounted (dev_name), the mount point (mnt_point), the file system type (fs_Type), the mode (mode), the last access time (A_time), and others.

A "dev_name" is expressed by attaching an LU number to "/dev/lu". For "fs_Type" data, the type of a file system is stored. There are three file system types: meta, data, and temp; "meta" indicates a meta file system which stores a directory tree and file attributes such as the location to store a file are stored, "data" indicates a file system type which stores a file that can be updated, and "temp" indicates a file system in which an LU storing a file that cannot be updated is mounted temporarily.

The "mode" represents an attribute of the mount point in question. The symbol "r" denotes readable, "w" denotes writable, and "rw" denotes readable/writable.

For the "last access time", the time at which the mounted LU is last accessed (read or write, for example) is recorded.

FIG. 3 is an explanatory diagram of the MAP Table 2042 held in the memory 2002 of the NAS head 200.

The MAP Table 2042 is used to manage the association between every LU and LDEV that are managed by the NAS head 200.

The MAP Table 2042 is composed of an LDEV number (LDEV num), the type of an LDEV (Type), an LU number (LU num) to which the LDEV is allocated, and others.

Examples of the LDEV Type include "cmd", "regular", and "WORM". The symbol "cmd" denotes a command device used as the target of a command issued from a client. Commands directed to the RAID device 100 to secure an LDEV, associate an LDEV with an LU (mapping), change the LDEV type, and the like are sent from the NAS head 200 to an LDEV of "cmd" Type. An LDEV denoted as "regular" is one that allows a client to read and write a file. The Type "WORM" indicates that a file in an LDEV can be read but not written.

When the LU num is "−1" (in the example of FIG. 3, the LU num associated with an LDEV num 500 is "−1"), it means that the LDEV has no LU allocated thereto.

FIG. 4 is an explanatory diagram showing an example of the LU Table 1401 in the shared memory 140 of the RAID device 100.

The LU Table 1401 is made for each controller 110 provided in the RAID device 100, and is stored in the shared memory 140. In the configuration example of FIG. 1, there are two of the controller 110 and accordingly the shared memory 140 stores two of the LU Table 1401, each of which is for one of the two controllers. Each LU Table 1401 is composed of an LU number (LU num), the number of the LDEV (LDEV num) allocated to the LU that is denoted by the LU number, and others.

Upon receiving a block read/write request from the NAS head 200, the controller 110 obtains the LU number contained in the request. Then the controller 110 looks up its own LU Table 1401 for the LDEV number that is associated with the obtained LU number. Thus the block read/write processing is performed on the LDEV that is specified by the obtained LDEV number.

FIG. 5 is an explanatory diagram showing an example of the LDEV Table 1402 in the shared memory 140 of the RAID device 100.

There is only one LDEV Table 1402 throughout the entire RAID device 100, which is held in the shared memory 140. The contents of the LDEV Table 1402 define configurations of LDEVs in the disk drive 130.

The LDEV Table 1402 is composed of an LDEV number (LDEV num) unique to an LDEV throughout the RAID device 100, the type of the LDEV (type), the size of the LDEV (size), and others. There are three LDEV types as has been described referring to FIG. 3. The size means the maximum storage capacity of the LDEV in question.

FIG. 6 shows an example of meta-information (metadata) stored in the meta file system (Meta FS) 1301 of the disk drive 130.

Meta-information is information on files kept in the disk drive 130 and is stored for each of the files in the Meta FS 1301.

Each piece of meta-information is composed of the name of a file (name), the size (size) of the file, the number of the LDEV that stores the file (LDEV num), the local path name (LDEV path) of the local file that stores the file in the LDEV, the time at which the file is last accessed (last access), the type of the file (type), and others.

As has been described, file type examples include a file type which allows read and write (regular) and a file type which allows read but not write (WORM).

Referencing such meta-information yields the name of a file, the size of the file, the number of the LDEV where the file is stored, the name of the directory path storing the file, the time the file is last accessed, and the type of the file.

Described next is the operation of the storage system of this embodiment.

Figure 7:
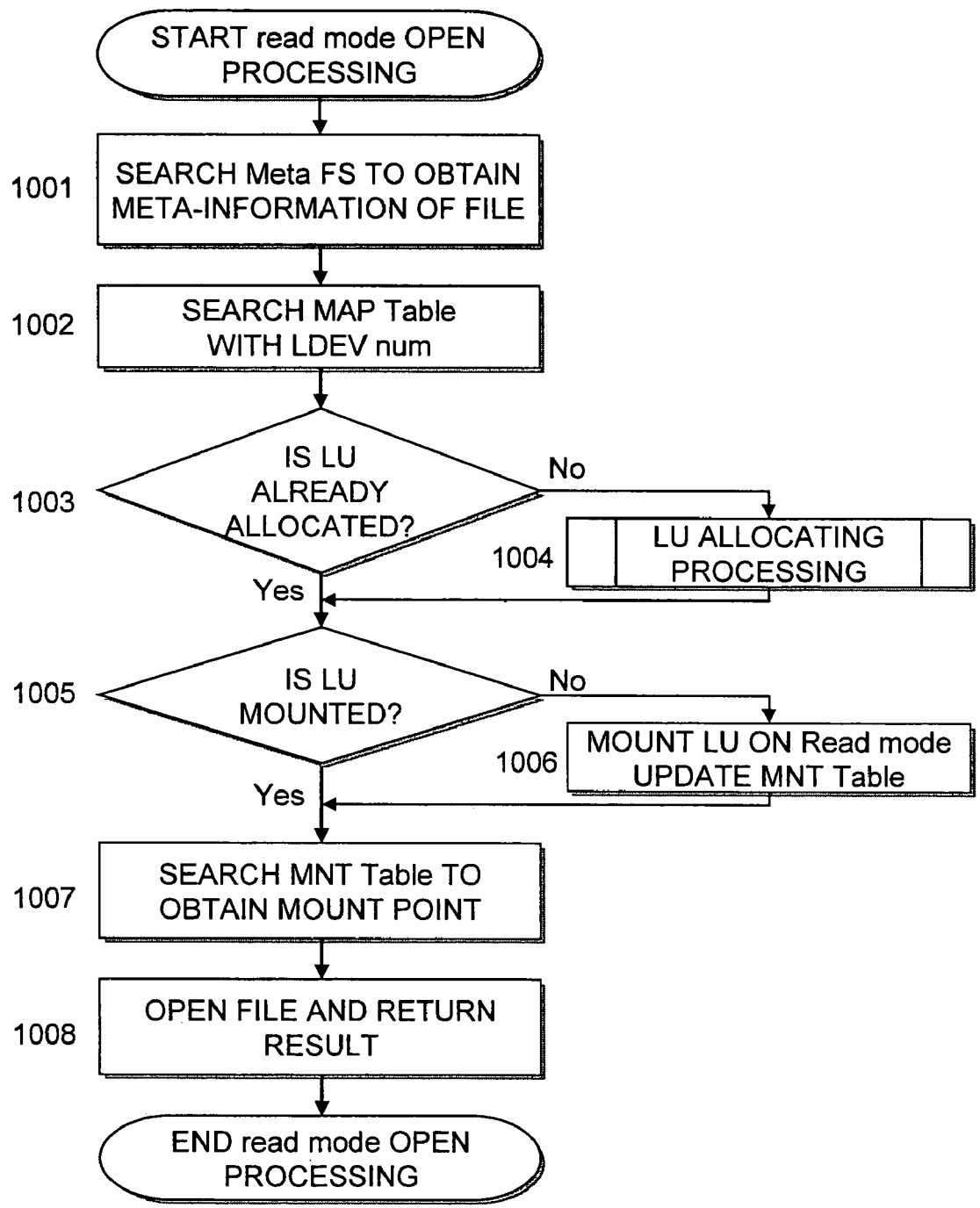
FIG. 7 is a flow chart showing processing which is executed, upon an OPEN request made in a file read mode, in a NAS head 200 according to the first embodiment of the present invention.

FIG. 7 is a flow chart showing processing executed by the NAS head 200 when a file is opened on a read mode upon request from the NAS client 300.

The NAS client 300 sends to the NAS head 200 a request to open a file on the read mode. Receiving the request from the NAS client 300, the NAS head 200 obtains a file name contained in the request. The NAS head 200 then references the Meta FS 1301 of the disk drive 130 in the RAID device 100 to obtain meta-information (FIG. 6) associated with the file name obtained (Step S1001).

Next, the objective LDEV number is pulled out of the obtained meta-information. The MAP Table 2402 is then looked up for the LU number that is associated with the obtained LDEV number (Step S1002).

Referring to the LU number retrieved, the NAS head 200 judges whether an LU is allocated or not (Step S1003). Specifically, when the retrieved LU number is "−1", it is judged that no LU is allocated to the LDEV specified by the obtained LDEV number and the process proceeds to processing for allocating an LU to the LDEV denoted by that LDEV number (LU allocating processing) (Step S1004). As an LU is allocated to the LDEV through the LU allocating processing, which will be described later with reference to FIG. 7, the process proceeds to Step S1005.

On the other hand, when it is judged in Step S1003 that an LU has already been allocated, the process proceeds to Step S1005 skipping the LU allocating processing of Step S1004.

In Step S1005, the MNT Table 2032 is referenced to judge whether the LU that is specified by the LU number is mounted or not. When the LU is judged to be not mounted, the LU is mounted (Step S1006) and then the process proceeds to Step S1007.

In the case where the LU is judged to be already mounted, on the other hand, the process proceeds to Step S1007 skipping Step S1006.

In Step S1007, the MNT Table 2032 is referenced to pull out the mount point associated with the obtained number of the LU that has been mounted.

Then a relative path contained in the obtained metainformation is used as a relative path from the obtained mount point to perform the read OPEN processing on the requested file. The result of the read OPEN processing is sent to the NAS client 300 (Step S1008).

This series of processing enables the NAS client 300 to perform the file open processing on the read mode through a file system of the NAS head 200.

Figure 8:
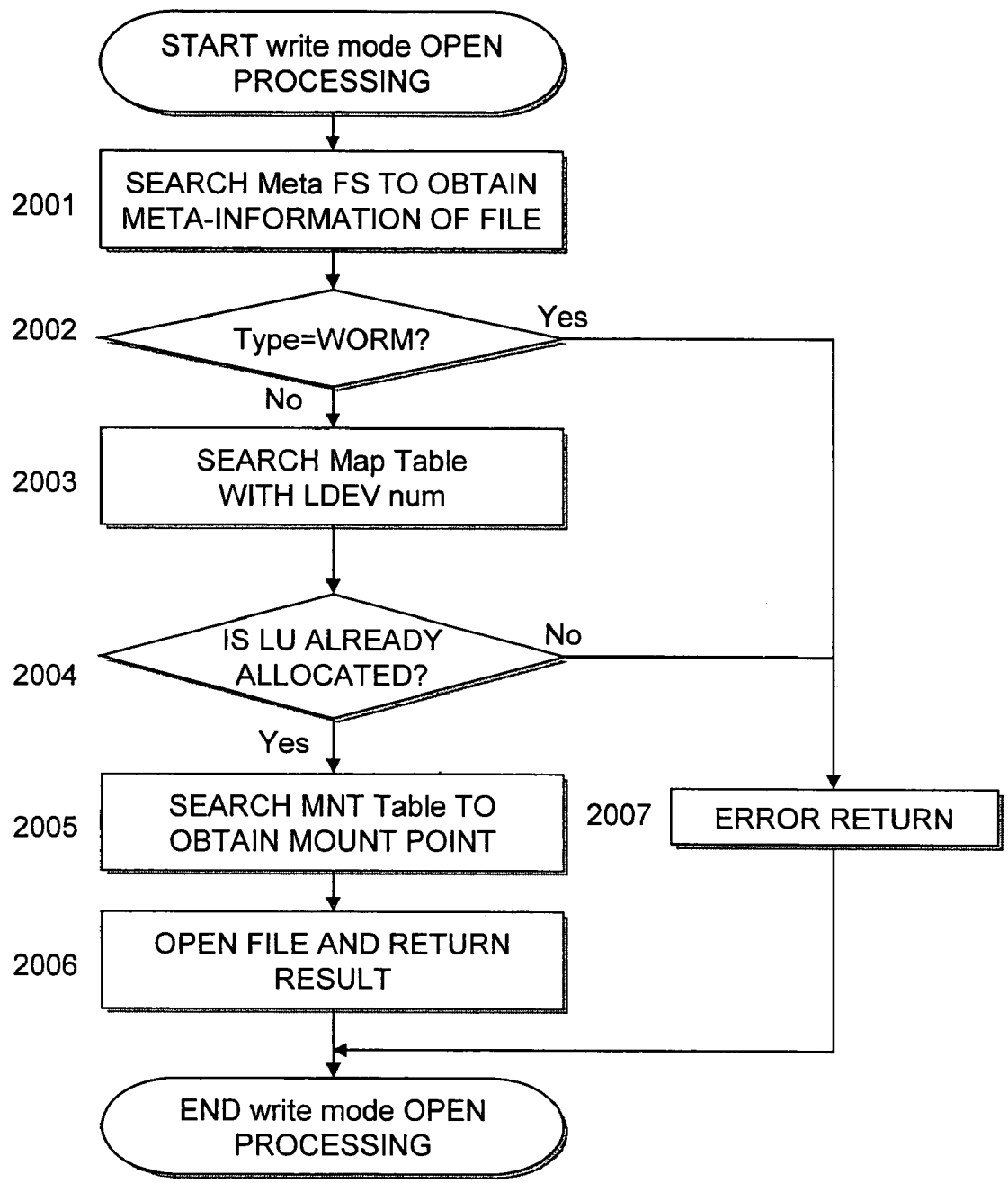
FIG. 8 is a flow chart showing processing which is executed, upon an OPEN request made in a file write mode, in the NAS head 200 according to the first embodiment of the present invention.

FIG. 8 is a flow chart showing processing executed by the NAS head 200 when a file is opened on a write mode upon request from the NAS client 300.

The NAS client 300 sends to the NAS head 200 a request to open a file on the write mode. Receiving the file OPEN request from the NAS client 300, the NAS head 200 obtains a file name contained in the request. The NAS head 200 then references the Meta FS 1301 of the disk drive 130 in the RAID device 100 to obtain meta-information (see FIG. 6) on the obtained file name (Step S2001).

Next, the Type of the file is pulled out of the obtained meta-information to check whether the Type is "WORM" or not (Step S2002). When the file Type is found to be "WORM", the file cannot be opened on the write mode and an error is sent to the NAS client 300 that has made the request to end the processing (Step S2007).

In the case where the file Type is found out to be other than "WORM", the objective LDEV number is picked up from the obtained meta-information. The MAP Table 2402 is then looked up for the LU number that is associated with the obtained LDEV number (Step S2003).

Referring to the LU number retrieved, the NAS head 200 judges whether an LU is allocated or not (Step S2004). When the retrieved LU number is "–1", it is judged that no LU is allocated to the LDEV specified by the obtained LDEV number. In this case, an error is sent to the NAS client 300 that has made the request and the processing is ended (Step S2007). In the system of this embodiment, as described above, a file OPEN request on the write mode for an LDEV to which no LU is allocated is unacceptable since any LDEV that has no LU allocated thereto constitutes the Temp FS 1303, which stores WORM files.

On the other hand, when it is judged in Step S2004 that an LU has already been allocated, the MNT Table 2032 is referenced to pull out the mount point associated with the obtained number of the LU that has been mounted (Step S2005).

Then a relative path contained in the obtained meta-information is used as a relative path from the obtained mount point to perform the write OPEN processing on the requested file. The result of the write OPEN processing is sent to the NAS client 300 (Step S2006).

This series of processing enables the NAS client 300 to open a file on the write mode through a file system of the NAS head 200.

It should be noted that, in the case of an LU WRITE request made by the SAN client 350 to the RAID device 100 without the intermediary of the NAS head 200, the WORM function is obtained through control by the controller 110. Specifically, as a write request is made by the SAN client 350, the LDEV guard program 1112 of the controller 110 looks up the LDEV Table for the Type of the LDEV associated with the LU in question. When the retrieved Type is "regular", the LDEV grants the write request. On the other hand, when the retrieved Type is "WORM", the write request on the LDEV is denied and an error is sent to the SAN client 350.

Figure 9:
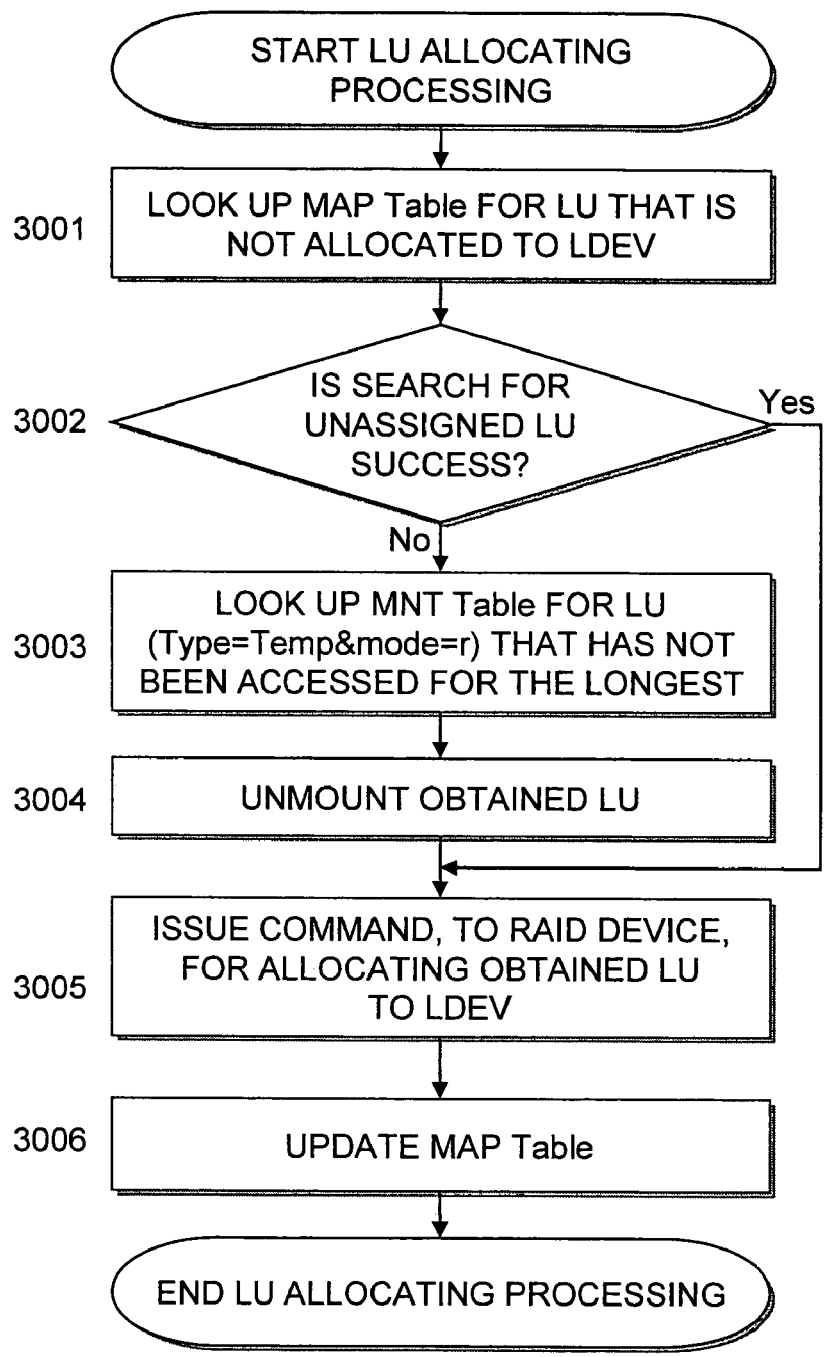
FIG. 9 is a flow chart showing LE allocating processing which is executed in the NAS head 200 according to the first embodiment of the present invention.

FIG. 9 is a flow chart showing the LU allocating processing (Step S1004 in FIG. 7) executed by the NAS head 200.

First, the MAP Table 2042 is looked up for an LU that is not allocated to an LDEV (Step S3001). The NAS head 200 then judges whether or not the search for an unallocated LU has succeeded, in other words, whether there is an unallocated LU or not (Step S3002). When it is judged that there is an unallocated LU, the process proceeds to Step S3005.

When it is judged that there is no LU left unallocated, the MNT Table 2032 is looked up for the LU that has not been accessed for the longest time out of the LUs whose Type is "Temp" and whose mode is "r" (read) by checking the A_Time (Step S3003). The thus retrieved LU is unmounted (Step S3004).

Then an LU allocating command is issued to the RAID device 100 in order to allocate the retrieved LU to an LDEV (Step S3005).

Specifically, the NAS head 200 issues an LU allocating command having as parameters the LDEV num of the LDEV to which the LU is to be allocated and the LU num, to the LU number of "cmd" (for control) defined in the MAP Table 2042. The LU allocating command issued is received by the controller 110 in the RAID device 100 which exchanges data with the NAS head 200. The LDEV changer program 1122 of the controller 110 that has received the command changes, based on the parameters of the LU allocating command, the association between LUs and LDEVs in the LU Table 1401 held in the shared memory 140 which is associated with the controller 110 that has received the command.

The NAS head 200 then sets the number of the allocated LU in the entry of the corresponding LDEV of the MAP Table 2042 which is held in the memory 2002.

An LU is allocated to an LDEV that has not been assigned an LU through this series of processing.

When there is no LU unallocated, one that has not been accessed longest out of the LUs mounted to the file system is unmounted to be allocated to the LDEV. In Step S3003, an LU whose Type is "Temp" and whose mode is "r", namely, an LU set as WORM is unmounted.

WORM file creating processing is discussed next.

In this embodiment, file data is usually stored in the Data FS of the disk drive 130. Of the files stored in the Data FS, the NAS head 200 looks up for those that have not been accessed for a given period (several months to several years, for example) and moves file data of such files as WORM files to the Temp FS.

Figure 10:
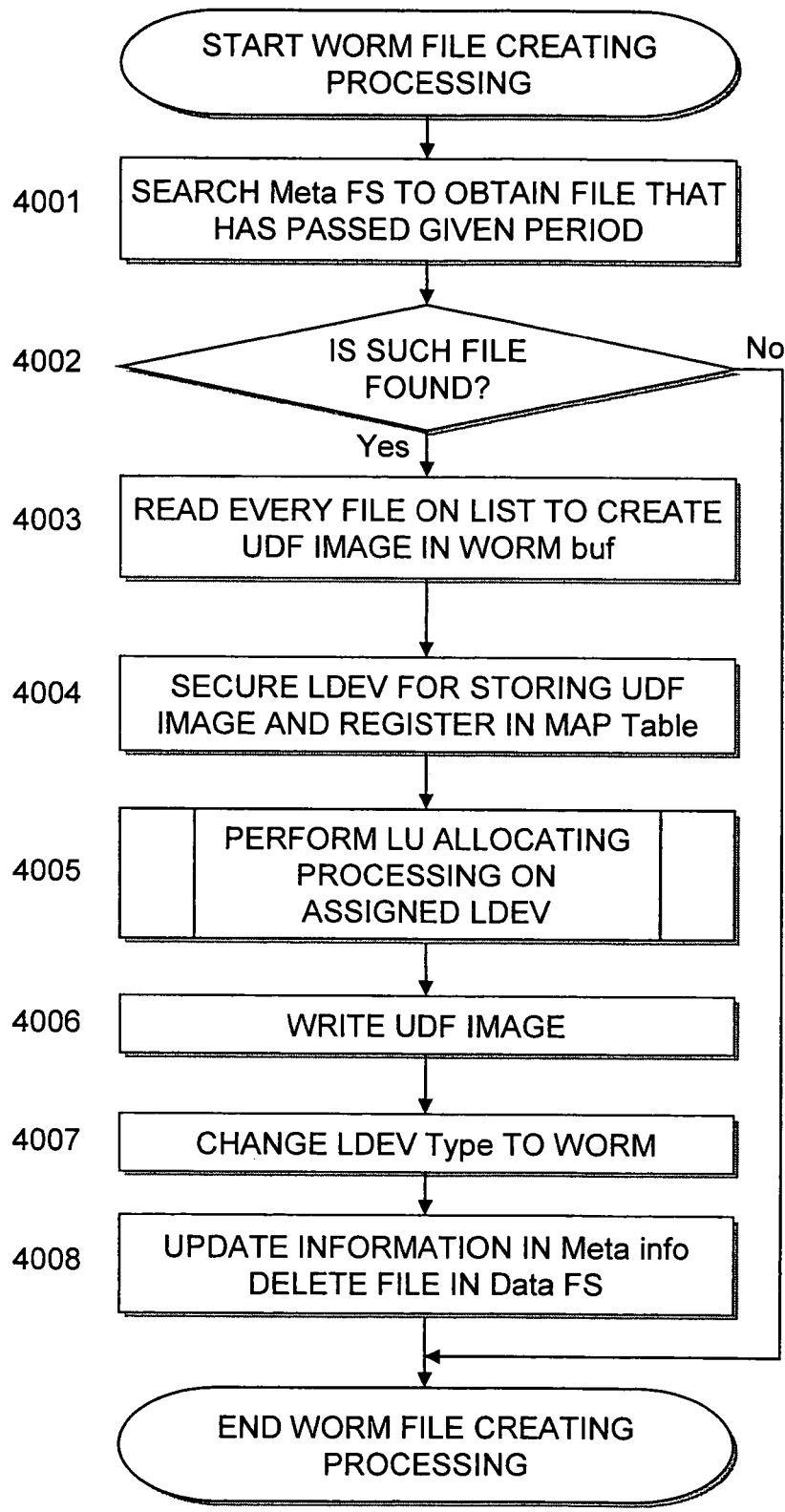
FIG. 10 is a flow chart showing WORM file creating processing which is executed in the NAS head 200 according to the first embodiment of the present invention.

FIG. 10 is a flow chart showing the WORM file creating processing executed by the WORM file creating processing program 2012 held in the memory 2002 of the NAS head 200.

The WORM file creating processing program 2012 searches the Meta FS 1301 in the disk drive 130 of the RAID device 100 for a file that has not been accessed for a given period (Step S4001). Each piece of Meta info (see FIG. 6) held in the Meta FS 1301 keeps the date and time of the last access to respective files stored in the disk drive 130. The NAS head 200 obtains the last access date and time and, when there is any that is over the given period, information on the file in question is obtained and listed for the record.

Then whether a file that has not been accessed for a given period is found in Step S4001 or not is checked (Step S4002). When the check finds no file that has not been accessed for the given period, the WORM file creating processing is ended since there is no file to be turned into a WORM file.

On the other hand, when a file that has not been accessed for the given period is found as a result of the checking, the whole data of the file is read out of the Data FS 1302 first to create a UDF (Universal Disk Format) image from the read file. The created UDF image is stored in the WORM buf 2052 of the memory 2002 (Step S4003).

Then an LDEV is secured in order to store the UDF image created (Step S4004). Specifically, an LDEV securing command which specifies the size required to store the UDF image is sent to the RAID device 100. The controller 110 of the RAID device 100 secures an LDEV whose Type is "regular" and which meets the specified size based on the command received.

As the LDEV is secured, the WORM file creating processing program 2012 registers information of the secured LDEV in the MAP Table 2032 held in the memory 2002.

Next, the LU allocating processing (see FIG. 9) is performed on the secured LDEV (Step S4005). The UDF image stored in the WORM buf 2052 is written in the LU that is allocated to the secured LDEV through the LU allocating processing (Step S4006).

Then the Type of the LDEV in which the UDF image is written is set to "WORM" (Step S4007). In this processing, a command for setting the LDEV to WORM is sent to the RAID device 100. The controller 110 of the RAID device 100 receives the command and sets the Type of the LDEV of the LDEV Table 1402 held in the shared memory 140 to "WORM". Meanwhile, the NAS head 200 sets the Type of the corresponding LDEV of the MAP Table 2042 held in the memory 2002 to "WORM".

Lastly, Meta info of every file that has been turned into a WORM file is updated and data of the files is deleted from the Data FS 1302 (Step S4008). Specifically, the file data on the Data FS 1302 is deleted with the use of the LDEV path of Meta info of each file that has been turned into a WORM file. Thereafter, the number of the LDEV in which the UDF image is written is set as the LDEV num in the Meta info, the path name in the UDF is set as the LDEV path in the Meta info, and "WORM" is set as the Type in the Meta info.

Through the above processing, a file that has not been accessed for a given period can be turned into a WORM file.

Although in the processing example shown in FIG. 10, the NAS head 200 reads a file to be turned into a WORM file, creates a UDF image from the file, stores the image in the buffer, and writes the image in the RAID device 100, the RAID device 100 may move the file following instructions of the NAS head 200. In this case, the controller 110 needs to have the function of a file system. Upon receiving an instruction from the NAS head 200, the controller 110 converts a file specified in the instruction into a UDF image, which is then stored in the Temp FS 1303. In this way, processing on the part of the NAS head 200 is reduced as well as data communication between the NAS head 200 and the RAID device 100.

In the processing shown in FIG. 10, files that have not been accessed for a given period are uniformly searched for turning the files into WORM files. Alternatively, the time period for turning a file into a WORM file may vary from one file to another. In this case, information on how long a file has to wait before being turned into a WORM file is contained in Meta info of the file. A time period of one year, for instance, is set counting from the day the file is stored as data file in the RAID device 100. This information is pulled out of the Meta info of the file in Step S4001 of FIG. 10 and, if it is found that the set time period (one year) has expired, the file is turned into a WORM file. The subsequent processing is as described above.

In the thus structured first embodiment of the present invention, Type is set by the LDEV Table 1402 for each LDEV that constitutes the disk drive 130 of the RAID device 100. This makes it possible to, for instance, permit read alone in an LDEV that is set to "WORM", thereby realizing the WORM function on the LDEV level of the RAID device 100. In addition, since the Temp FS 1303 which holds WORM files is mounted/unmounted to a file system by the NAS head 200 as the need arises, it is possible to save the resources of the NAS head 200 which provides the file system and of the RAID device 100.

Figure 11:
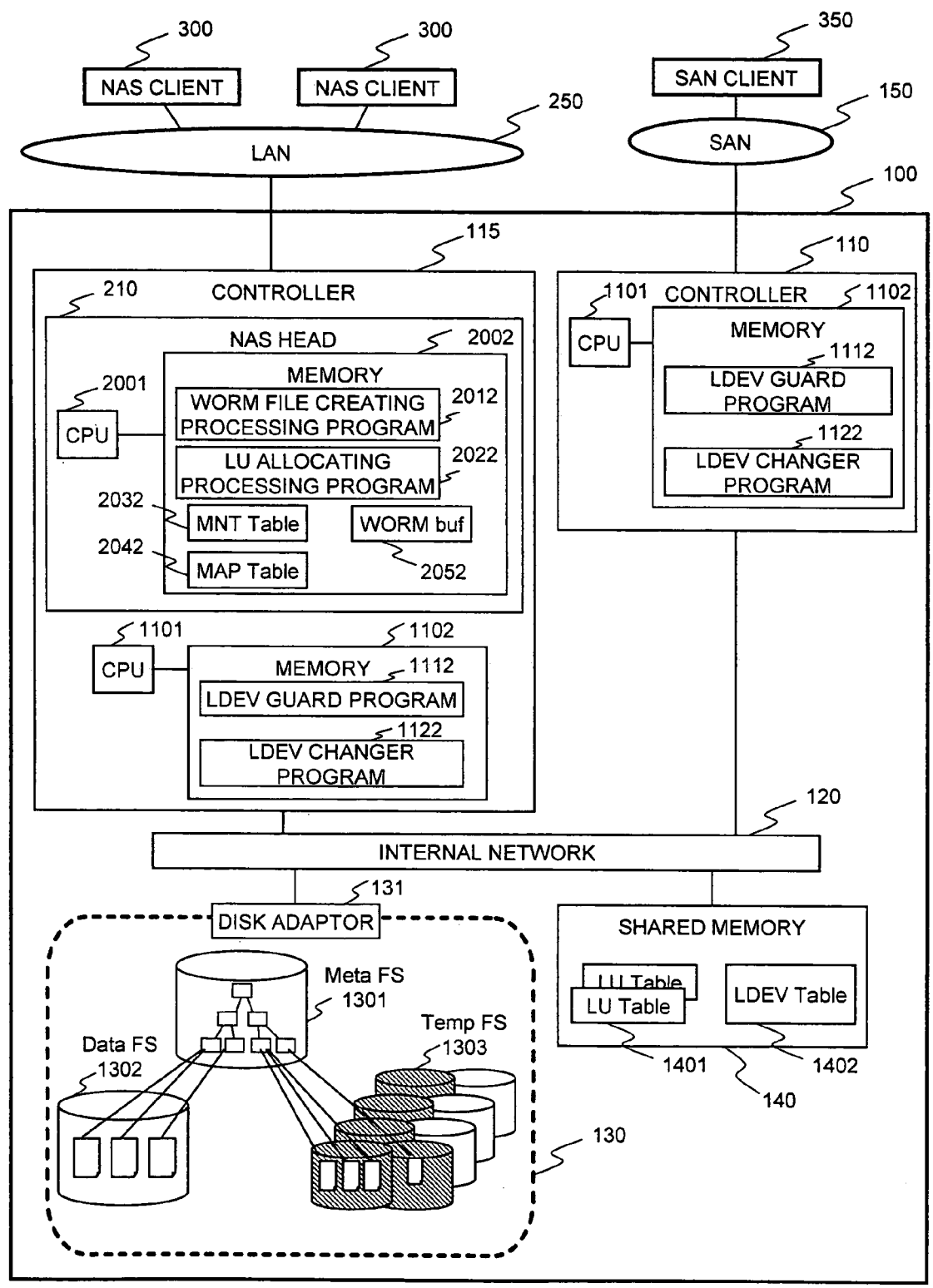
FIG. 11 is a block diagram showing a configuration of a storage system according to a modified example of the first embodiment of the present invention.

The storage system shown in FIG. 1 may be modified as shown in FIG. 11 in which the controller 110 is given a function of a NAS head 210 and a controller 115 constructed as one module is provided in the RAID device 100. This configuration makes the RAID device 100, instead of the NAS head, the one that provides the NAS client 300 with a file system and at the same time makes it possible to use WORM also to limit access from the SAN client 350 via the SAN 150.

A storage system according to a second embodiment of the present invention is described next.

The first embodiment shows a method in which data stored in an LDEV that has not been accessed for a given period is automatically turned into WORM data by the NAS head 200. The first embodiment is contrasted by the second embodiment where the NAS client 300 gives an instruction to turn a file into a WORM file for each file. The NAS head 200 turns the relevant file into a WORM file with the instruction from the NAS client 300 as the trigger. Components in the second embodiment that are identical to those in the first embodiment are denoted by the same reference symbols, and descriptions on such components are omitted here.

In the second embodiment, conducting the WORM file creating processing for each file upon instruction from the NAS client 300 is made possible by setting an LDEV for storing a WORM file such that a file can additionally be written in the LDEV. Specifically, a field indicating the head block of a writable area is added to the LDEV Table 1402, so that an area that is turned into WORM and a writable area can be managed for each LDEV. In the WORM file creating processing, a UDF image in an LDEV a part of which has already been turned into WORM is read and sent to the WORM buf 2052 and, after creating a UDF image to which a file to be turned into a WORM file is added, the added portion alone is written in the LDEV.

FIG. 12 is an explanatory diagram showing the LDEV Table 1402 in the second embodiment.

The LDEV Table 1402 of this embodiment has a "wbegin" field in addition to the contents of the LDEV Table 1402 shown in FIG. 5. The wbegin field indicates a writable area of an LDEV whose Type is "WORM". In other words, the area preceding the block number indicated by wbegin is an unwritable area, while the area following the block number of wbegin is an area in which data can be written only once.

In the first embodiment described above, files turned into WORM files are written at once in an LDEV and then the Type of the LDEV is set to "WORM" in the LDEV Table 1402. Once the LDEV Type is set to "WORM", writing in the LDEV is prohibited and no additional data can be written in the LDEV.

In the second embodiment, on the other hand, the Type in the LDEV Table 1402 is set to "WORM" and the wbegin field (FIG. 12) is set to "0" when an LDEV is secured. When a WORM file (data in the UDF format) is written in this LDEV thereafter, the write process is concluded by setting as wbegin the value "the last block of the written data +1". With this processing, only the blocks that precede the block number of wbegin are made unwritable.

FIG. 13 shows the MAP Table 2042 in the second embodiment. The MAP Table 2042 of this embodiment has "size" and "wbegin" fields in addition to the contents of the MAP Table 2042 shown in FIG. 3. The "size" field indicates the size of an LDEV. The "wbegin" field indicates the first block of a writable area of the LDEV as has been described referring to FIG. 12.

Figure 14:
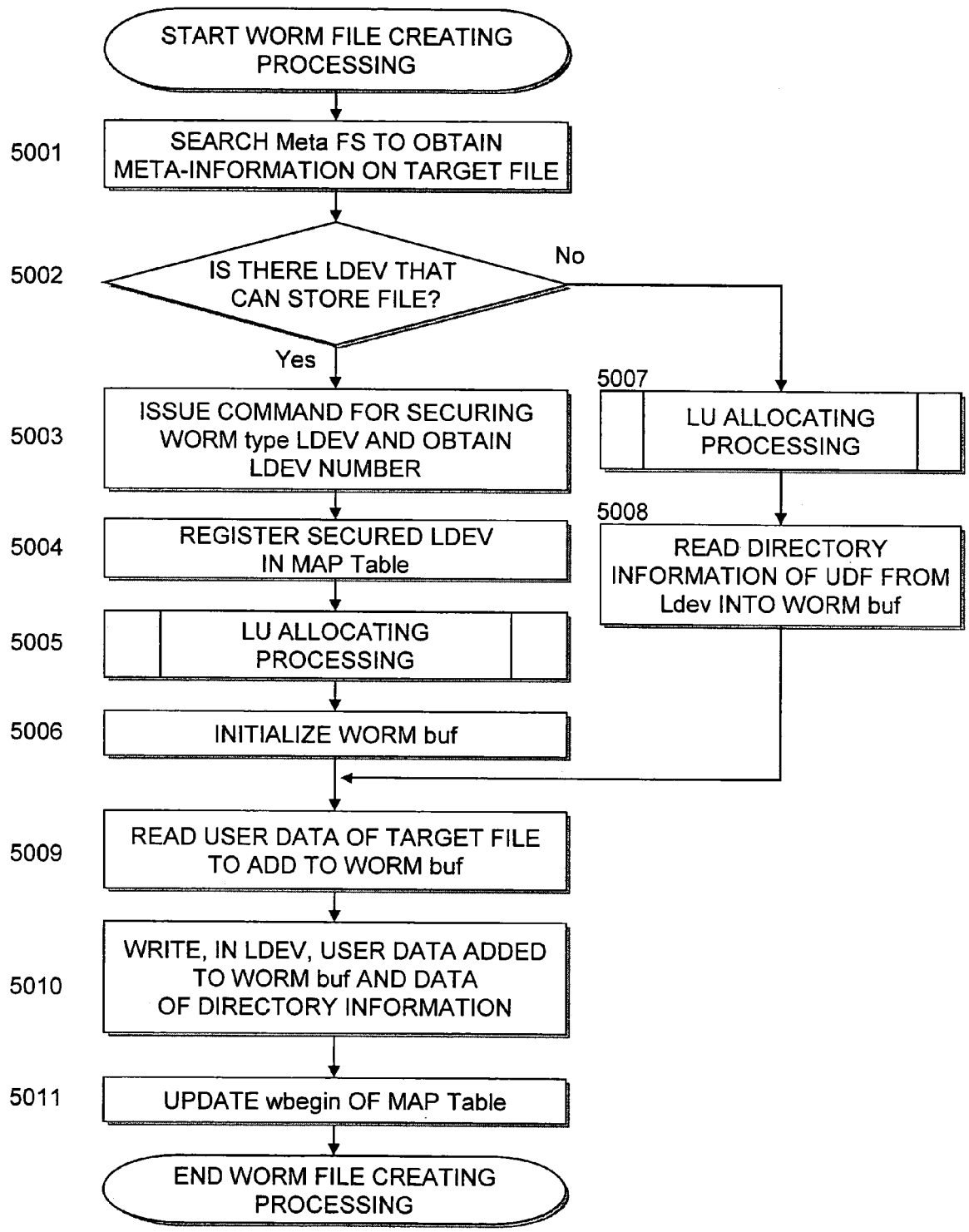
FIG. 14 is a flow chart showing WORM file creating processing which is executed in a NAS head 200 according to the second embodiment of the present invention.

FIG. 14 is a flow chart showing WORM file creating processing in the second embodiment which is conducted by the NAS head 200 by executing the WORM file creating processing program 2012 held in the memory 2002 of the NAS head 200.

A NAS client specifies a file and sends, via the NAS client 300, an instruction to turn the file into a WORM file. The NAS head 200 receives the instruction and carries out the processing of FIG. 14.

Upon receiving a WORM file creating instruction from the NAS client 300, the NAS head 200 first looks up the Meta FS in the disk drive 130 of the RAID device 100 for meta-information of the file in question (Step S5001).

Then it is judged whether or not there is an LDEV that can store the specified file (Step S5002). Specifically, the MAP Table 2042 is referenced to judge whether or not there is an LDEV having a capacity large enough to store the file among LDEVs whose Type is "WORM". The LDEV size required to store a file is obtained by subtracting the value of the wbegin field in the MAP Table 2042 from the value of the size field in the MAP Table 2042.

When storing a file in an LDEV whose Type is "WORM", it is necessary to store meta-information of the file as well as the file data. Accordingly, the chosen LDEV has to have a capacity large enough to store the file data and the meta-information both.

In the case where an LDEV capable of storing the specified file is found, the LU allocating processing (see FIG. 8) for allocating an LU is performed on the LDEV (Step S5007). Next, directory information of this LDEV is read into the WORM buf 2052 of the memory 2002 (Step S5008).

When it is judged in Step S5002 that there is no LDEV capable of storing the file, an LDEV whose Type is "WORM" is secured (Step S5003). Specifically, an LDEV securing command which specifies the capacity required to store the specified file is sent to the RAID device 100. The controller 110 of the RAID device 100 secures an LDEV whose Type is "WORM" based on the received command.

Then the number of the secured LDEV (LDEV num) is registered in the MAP Table 2042 (Step S5004). The LU allocating processing (see FIG. 8) for allocating an LU is performed on the secured LDEV. After the LU is allocated to the LDEV, the WORM buf 2052 of the memory 2002 is initialized (Step S5006). Specifically, an empty UDF image whose capacity is large enough to store the specified file is created. The process then proceeds to Step S5009.

In Step S5009, user data of the specified file is read out of the Data FS in the disk drive 130 of the RAID device 100. The read file is added as a UDF image to the WORM buf 2052 to create a UDF image that is to be written in the LDEV.

When writing the UDF image in the LDEV, meta-information such as directory information is written along with the user data in the LDEV (Step S5010). A write start block of the LDEV can be known from the value indicated by the wbegin of the LDEV in the MAP Table 2042. The controller 110 is instructed to write in the LDEV by specifying the number of the LU that is allocated to the LDEV.

Next, the wbegin value in the MAP Table 2042 is changed to one to which the capacity of data written in the LDEV is added (Step S5011). At this point, the NAS head 200 instructs the controller 110 of the RAID device 100 to update the wbegin value of the LDEV Table 1042 as well.

Through the above processing, a file can be turned into a WORM file upon instruction from the NAS client 300.

The thus structured second embodiment of the present invention is, in addition to having the effects of the first embodiment, capable of turning any arbitrary file into a WORM file as the need arises since a WORM file can be created upon instruction from the NAS client 300. Furthermore, data of a WORM file is additionally written in an LDEV and therefore LDEVs can be used efficiently, which is a great help to cutting back the resource of the RAID device 100.

A period in which no file is allowed to be updated may be set for an LDEV that stores a file turned into a WORM file. For instance, a no-file-update period is set for each LDEV in the LDEV Table 1402. File data stored in the corresponding LDEV cannot be updated or deleted until the no-file-update period is over (this makes the file a WORM file). After the no-file-update period passes, it is allowed to, for example, delete the file in order to reduce the disk capacity. A user specifies a no-file-update period via the NAS client 300. The NAS head 200 instructs the controller 110 of the RAID device 100 to set the specified no-file-update period in the LDEV Table 1402 before the WORM file creating processing is started.

The above first and second embodiments take as an example a case in which the NAS client 300 gives instructions on the unit of conversion to WORM, how long it takes to start conversion to WORM, and timing of conversion to WORM. Instead of the NAS client 300, a storage management server may give those instructions. This facilitates storage management since the storage management server can also manage WORM files in a centralized manner.

While the present invention has been described in detail and pictorially in the accompanying drawings, the present invention is not limited to such detail but covers various obvious modifications and equivalent arrangements, which fall within the purview of the appended claims.

What is claimed is:

1. A storage system accessible by a computer, comprising:
   a disk drive unit comprised of plural logical devices;
   a memory module which stores information about the disk drive unit;
   a first controller comprised of an interface which provides a file system to the computer to facilitate access of files by the computer; and
   a second controller which receives access requests from the computer, wherein:
   the first and second controllers, when a write request is made by the computer, looks up in the memory module for information on a logical target device that is a target of the write request and, when the logical target device is set to unwritable, inform to the computer that the logical target device is set to unwritable;
   the memory module stores a logical unit table which indicates an association between the logical target device and an allocated logical unit allocated to the logical target device;
   where the allocated logical unit allocated to the logical target device is accessible by the computer using the file system;
   and where at least one of a first attribute, a second attribute, and a third attribute is set for each logical unit by the file system, the first attribute being set for designating meta logical units used to store meta-information of a file held in the disk drive unit, the second attribute being set for designating file logical units used to store file data, the third attribute being set for designating archive logical units to store file data and to be selectively mountable and unmountable for file access in the disk drive unit;
   wherein the interface:

stores a mount table indicating which logical unit is mounted to the file system and indicating whether a write in the logical unit is possible; and stores a map table indicating an association between the logical target device and the allocated logical unit allocated to the logical target device; and wherein the interface:

obtains a list of files that are not accessed for a predetermined period, referring to meta-information held in the mete logical units for which the first attribute is set;

creates a Universal Disk Format image containing files on the list of files;

secures a logical targeted device that is capable of storing the Universal Disk Format image;

judges whether or not any logical unit is allocated to the secured logical targeted device;

searches, when no logical unit is allocated to the secured logical targeted device, for a logical unit that is not assigned to any logical device from among logical units in which the third attribute is set, using information stored in the memory module;

obtains, when no logical unit is found that is not assigned to any logical device, information of an oldest logical unit that has not been accessed for a longest period, from among the logical units in which the third attribute is set;

unmounts the oldest logical unit for which the information is obtained off the file system;

instructs to the first controller to allocate at least a portion of the unmounted logical unit as a new logical device;

reflects a result of the allocating to the information about the map table, the information being stored in the memory module;

specifies the logical unit to store the created Universal Disk Format image in the new logical device to which the logical unit is allocated; and sets information on the new logical device that stores the Universal Disk Format image to unwritable, the information being stored in the memory module.

2. A storage system accessible by a computer, comprising:

a disk drive unit comprised of plural logical devices;

a memory module which stores information about the disk drive unit; and a controller comprised of an interface which provides a file system to the computer to facilitate access of files by the computer, wherein:

the controller:

obtains, when a write request is made by the computer, information on a logical target device that is a target of a write request, from the memory module; and when the logical target device is set to unwritable, informs to the computer that the logical target device is set to unwritable; and where the interface:

obtains a list of files that are not accessed for a predetermined period, referring to meta-information held in the disk drive unit;

secures a logical targeted device that is capable of storing the files of the obtained list of files; and instructs the controller to store in the secured logical targeted device the files on the list of files, and sets information of the secured logical targeted device that stores the files to unwritable, the information being stored in the memory module.

3. The storage system according to claim 2, wherein:

the memory module stores a logical unit table which indicates an association between a subject logical device and an allocated logical unit allocated to the subject logical device;

where the allocated logical unit allocated to the subject logical device is accessible by the computer using the file system;

and where at least one of a first attribute, a second attribute, and a third attribute is set for each logical unit by the file system, the first attribute being set for designating meta logical units used to store meta-information of a file held in the disk drive unit, the second attribute being set for designating file logical units used to store file data, the third attribute being set for designating archive logical units to store file data and to be selectively mountable and unmountable for access in the disk drive unit; and wherein the controller controls change of an association between any logical device and corresponding logical unit.

4. The storage system according to claim 2, wherein:

upon receiving a file read request from the computer, the interface obtains information on a logical read-target device that stores the requested file, from meta-information of the logical units in which a first attribute for designating meta logical units used to store meta-information of a file is set;

where the interface judges whether each logical unit is associated with the logical read-target device storing the requested file or not;

and when a read-target logical unit is judged associated with the logical read-target device storing the requested file, the interface obtains a mount paint at which the read-target logical unit is mounted to the disk drive unit; and the interface opens the requested file in a read mode, using the obtained mount point.

5. The storage system according to claim 2, wherein:

upon receiving a file write request from the computer, the interface obtains information on a logical write-target device that stores the requested file, from meta-information of the logical units in which a first attribute for designating meta logical units used to store meta-information of a file is set;

where the interface judges from information stored in the memory module whether the write-target logical device represented by the obtained information is set to unwritable or not;

when the write-target logical device is set to unwritable, the interface informs to the computer that the write-target logical device is set to unwritable;

when the write-target logical device is set as writable, the interface judges whether any logical unit is associated with the write-target logical device or not;

when no logical unit is associated with the logical device, the interface informs to the computer that the logical unit is not associated with the logical device;

when a write-target logical unit is found associated with the logical device, the interface obtains a mount point at which the write-target logical unit is mounted; and the interface opens the requested file in a write mode, using the obtained mount point.

6. The storage system accessible by a computer, comprising:
   a disk drive unit;
   a memory module which stores information about the disk drive unit; and
   a controller comprised of an interface which provides a file system to the computer to facilitate access to a file, wherein:
   the disk drive unit includes plural logical devices;
   when a write request is sent from the computer to access a logical target device, the controller refers to information on the logical target device from the memory module and, when the logical target device is set to unwritable, the controller informs to the computer that the logical target device is set to unwritable; and
   the interface selectively mounts on and unmounts off at least one of the logical devices for archival access/storage;
   wherein:
   the memory module stores information about an association between the logical target device and an allocated logical unit allocated to the logical target device;
   where the allocated logical unit allocated to the logical target device is accessible by the computer to access the logical target device using the file system;
   and where at least one of a first attribute, a second attribute, and a third attribute is set for each logical unit by the file system, the first attribute being set for designating meta logical units used to store meta-information of a file held in the disk drive unit, the second attribute being set for designating file logical units used to store file data, the third attribute being set for designating archive logical units to store file data and to be selectively mountable and unmountable for file access in the disk drive unit; and
   wherein the controller controls change of an association between any logical device and corresponding logical unit.

7. The storage system according to claim 6, wherein:
   the interface, using information stored in the memory module, searches for a logical unit that is not assigned to any logical device from among logical units in which the third attribute is set;
   when the interface finds no logical unit that is not assigned to any logical device, the interface obtains information of an oldest logical unit that has not been accessed for a predetermined period from among the logical units in which the third attribute is set;
   the interface unmounts the oldest logical unit for which the information is obtained, from the disk drive unit;
   the interface instructs to the controller to allocate at least a portion of the unmounted logical unit as a new logical device; and the interface reflects a result of the allocating to the information about the association between the new logical device and the logical unit, the information being stored in the memory module.

8. A storage system accessible by a computer, comprising:
   a disk drive unit;
   a memory module which stores information about the disk drive unit; and
   a controller comprised of an interface which provides a file system to the computer to facilitate access to a file, wherein;
   the disk drive unit includes plural logical devices;
   when a write request is sent from the computer to access a logical target device, the controller refers to information on the logical target device from the memory module and, when the logical target device is set to unwritable, the controller informs to the computer that the logical target device is set to unwritable;
   where the memory module stores information about an association between the logical target device and an allocated logical unit allocated to the logical target device;
   where the allocated logical unit allocated to the logical target device is accessible by the computer using the file system;
   and where at least one of a first attribute, a second attribute, and a third attribute is set for each logical unit by the file system, the first attribute being set for designating meta logical units used to store meta-information of a file held in the disk drive unit, the second attribute being set for designating the file logical units used to store file data, the third attribute being set for designating archive logical units to store file data and to be selectively mountable and unmountable for file access in the disk drive unit; and
   wherein the interface:
   obtains information of the logical target device that stores a file contained in the write request, referring to meta-information held in the disk drive unit;
   judges whether or not a logical target device that can store the file exists;
   when it is judged that a logical target device that can store the file exists, provides an allocated logical unit allocated to the logical target device, and obtains data of the allocated logical unit, and obtains relevant data from the logical target device that stores the file, to store write data and the data of the assigned logical unit in the logical target device to which the logical unit is allocated;
   when it is judged that there is no logical target device that can store the file, issues a request to the controller to secure a candidate logical target device that can store the file;
   allocates an allocated logical unit to the secured candidate logical target device;
   obtains relevant data to store the data in the secured candidate logical target device to which the allocated logical unit is allocated; and
   sets information on the secured candidate logical target device that stores the file to unwritable, the information being stored in the memory module.

9. A storage system connected to an interface that provides a file system to a computer, and is accessible by the computer, comprising:
   a disk drive unit comprised of plural logical devices;
   a memory module which stores information about the disk drive unit; and
   a controller which receive an access request from the computer, wherein:
   the interface:
   obtains a list of files that have not been accessed for a predetermined period, referring to meta-information held in the disk drive unit;
   secures a logical target device storing the files from the list of files;
   instructs the controller to store the files on the list of files in the secured logical target device;
   and sets information on the secured logical target device that stores the files to unwritable, the information being stored in the memory module; and wherein the controller:
obtains, when a write request is made by the computer, information on the logical target device that is a target of a write request, from the memory module; and informs, when the logical target device is set to unwritable, a signal to the computer indicating mat the logical target device is set to unwritable.

10. A storage system according to claim 9, wherein:

a controller includes first and second controllers;

a memory module stores a logical unit table which indicates an association between the logical target device and an allocated logical unit allocated to the logical target device;

where the allocated logical unit allocated to the logical target device is accessible by the computer using the file system;

and where at least one of a first attribute, a second attribute, and a third attribute is set for each logical unit by the file system, the first attribute being set for designating mete logical units used to store meta-information of a file held in the disk drive unit, the second attribute being set for designating file logical units used to store file data, and the third attribute being set for designating archived logical units to store file data and to be selectively mountable and unmountable for file access in the disk drive unit;

where the interface stores:

a mount table indicating which logical unit is mounted to the file system and indicating whether a write in the logical unit is possible; and a map table indicating an association between the logical target device and the allocated logical unit allocated to the logical target device; and where the interface:

obtains a list of files that are not accessed for a predetermined period, referring to meta-information held in any logical units for which the first attribute is set;

creates a Universal Disk Format image containing files on the list of files;

secures a candidate logical target device that is capable of storing the Universal Disk Format image;

judges whether any predetermined logical unit is allocated to the secured candidate logical target device;

searches, when the no predetermined logical unit is allocated to the secured candidate logical target device, for a logical unit that is not assigned to any logical device from among logical units in which the third attribute is set, using information stored in the memory module;

obtains, when no logical unit is found that is not assigned to any logical device, information of an oldest logical unit that has not been accessed for the longest period from among the logical units in which the third attribute is set;

unmount the oldest logical unit for which the information is obtained off the file system;

instructs to the first controller to allocate at least a portion of the unmounted logical unit as a new logical device;

reflects a result of the allocating to the information being stored in the memory module;

specifies the logical unit to store the created Universal Disk Format image in the new logical device to which the logical unit is allocated; and sets information on the new logical device that stores the Universal Disk Format image to unwritable, the information being stored in the memory module.

* * * * *